US006853677B2

(12) United States Patent
Kim et al.

(10) Patent No.: US 6,853,677 B2
(45) Date of Patent: Feb. 8, 2005

(54) FINGER USING TIME DIVISION METHOD AND RAKE RECEIVER HAVING THE SAME

(75) Inventors: Kwang Soon Kim, Taejon (KR); Byung Yang Ahn, Taejon (KR); Jin Hee Han, Taejon (KR); Jae Wook Chung, Taejon (KR); Il Soon Jang, Cheongju (KR)

(73) Assignee: Electronics and Telecommunications Research Institute, Taejon (KR)

(*) Notice: Subject to any disclaimer, the term of this patent is extended or adjusted under 35 U.S.C. 154(b) by 753 days.

(21) Appl. No.: 09/746,153

(22) Filed: Dec. 22, 2000

(65) Prior Publication Data

US 2002/0041624 A1 Apr. 11, 2002

(30) Foreign Application Priority Data

Oct. 11, 2000 (KR) ........................................ 2000-59804

(51) Int. Cl.[7] .............................. H04B 1/69; H04B 1/38; H04B 7/216
(52) U.S. Cl. ........................ 375/148; 375/222; 370/342
(58) Field of Search ................................ 375/206, 148, 375/222, 147; 370/342, 441

(56) References Cited

U.S. PATENT DOCUMENTS

| 5,956,367 | A |   | 9/1999 | Koo et al. ................... 375/206 |
| 6,026,115 | A |   | 2/2000 | Higashi et al. .............. 375/200 |
| 6,078,611 | A | * | 6/2000 | La Rosa et al. ............. 375/147 |
| 6,151,328 | A | * | 11/2000 | Kwon et al. ................. 370/441 |
| 6,272,168 | B1 | * | 8/2001 | Lomp et al. ................. 375/222 |
| 6,275,484 | B1 | * | 8/2001 | Lynch et al. ................. 370/342 |
| 6,333,934 | B1 | * | 12/2001 | Miura ......................... 370/441 |
| 6,442,193 | B1 | * | 8/2002 | Hirsch ......................... 375/147 |
| 6,639,906 | B1 | * | 10/2003 | Levin ......................... 370/342 |
| 6,668,011 | B1 | * | 12/2003 | Li et al. ...................... 375/147 |
| 6,700,919 | B1 | * | 3/2004 | Papasakellariou ........... 375/130 |

OTHER PUBLICATIONS

Lee, S. et al., "Low–complexity architecture of rake receiver for multi–code CDMA system," *Electronics Letters* 34(14): 1382–1383, 1998.
Brunner, C. et al., "On Space–Time Rake Receiver Structures for WCDMA," *IEEE*, pp. 1546–1551, 1999.
Choi, Jinho, "A Receiver of Simple Structure for Antenna Array CDMA Systems," *IEEE Transactions on Vehicular Technology* 48(5):1332–1340, 1999.

* cited by examiner

*Primary Examiner*—Stephen Chin
*Assistant Examiner*—Cicely Ware
(74) *Attorney, Agent, or Firm*—Seed IP Law Group PLLC

(57) ABSTRACT

There is disclosed a finger for effectively processing signals received via multi-path in a receiver of a mobile communication system and a RAKE receiver having the finger. In processing signals received by a plurality of antennas in the present invention, a single finger batch-processes the signals received by the plurality of antennas using the property that the time delays of the received signals are almost same and a time division method. At this time, a single apparatus batch-processes a portion necessary for a common calculation and a plurality apparatus separately process portions necessary for separate calculations. Thus, the present invention can provide a high-performance finger and a RAKE receiver having the finger wherein a single finger can process each of signals received by a plurality of antennas.

13 Claims, 4 Drawing Sheets

FINGER USING TIME DIVISION METHOD AND RAKE RECEIVER HAVING THE SAME

TECHNICAL FIELD

The invention relates generally to a receiver of a mobile communication system. More particularly, the present invention relates to a finger using a time division method by which signals received by a plurality of antennas in a receiver of a mobile communication system are effectively processed and a RAKE receiver having the finger.

BACKGROUND OF THE INVENTION

FIG. 1 shows a construction of a conventional RAKE receiver. As shown, assuming that signals received from various paths and antennas are entered through independent paths, each finger controls each of the signals.

Radio frequency analog signals received by the M'-number of antennas 100 are converted into baseband digital signals at a RF analog to baseband digital converter 110. Then, the converted signals are inputted into a signal searcher 120 and a signal controller 130, respectively. The signal searcher 120 searches the intensity of the received signals and then informs the result to the signal controller 130 and fingers 140, respectively. Meanwhile, the signal controller 130 sends the signals received by the M'-number of antennas 100 to the fingers 140, one by one, according to information from the signal searcher 120.

In the above-mentioned conventional RAKE receiver, the complexity of the fingers becomes increased linearly depending on the number of the signal paths to be combined since one finger processes a single signal. Thereby, if the number of the signal paths is increased in order to increase the performance of the receiver, there arises a problem that the complexity of the receiver is further severe.

As one option to solve these problems, there has been proposed a thesis "A RECEIVER OF SIMPLE STRUCTURE FOR ANTENNA ARRAY CDMA SYSTEMS" by J. Choi, IEEE Trans. Vehic. Techn, Vol 48, No. 5, pp 1332–1340, 1999, which discloses that signals from various antennas and signals received via various paths are processed by only one finger. In the proposed receiver, when the signals are processed, they are processed at a time using time-space two-dimensional filtering scheme. However, there is a problem that the amount of calculation is increased since the coefficients of the filters must be calculated every symbols.

SUMMARY OF THE INVENTION

The present invention is contrived to solve the above-mentioned problems and the purpose of the present invention is to provide a finger of a simplified structure including a single apparatus for batch-processing a common calculation within a finger and a plurality of apparatuses for performing separate calculations. In the present invention, also, a single finger effectively processes signals, received by a plurality of antennas and having almost the same time delays, by using time-division method. Thus, it can provide a high-performance finger and a RAKE receiver having the finger.

In order to accomplish the above object, in a finger using a time division method according to the present invention and a RAKE receiver using the finger, the finger comprises an antenna signal combiner for combining signals, received by a plurality of antennas and having the almost same time delays, with an adequate delay to produce multiplexed signals; a tracking apparatus for receiving the multiplexed signals to estimate time delay information on the multiplexed signals; a de-spreading apparatus for de-spreading the multiplexed signals with the estimated time delay information, each of which are received from the antenna signal combiner and the tracking apparatus, respectively; and a demodulating apparatus of demodulating the de-spread signals received from the de-spreading apparatus, to estimate original signals received by the plurality of antennas.

Also, a finger according to the present invention comprises an antenna signal combiner for combining signals, received by a plurality of antennas and having the almost same time delays, with an adequate delay to produce multiplexed signals; a tracking apparatus for receiving the multiplexed signals to estimate time delay information on the multiplexed signals; a de-spreading apparatus for de-spreading the multiplexed signals with the estimated time delay information, each of which are received from the antenna signal combiner and the tracking apparatus, respectively; and a non-coherent demodulating apparatus of demodulating only the de-spread signals from the de-spread apparatus to estimate original signals received by the plurality of antennas.

Preferably, a RAKE receiver according to the present invention comprises a RF analog to baseband digital converter for converting RF analog signals received by a plurality of antennas having the almost same time delays into baseband digital signals; a signal searcher for receiving the output signals from the RF analog to baseband digital converter to generate information on the intensity of the baseband digital signals; a signal controller for receiving information on the intensity of the signals for the signal searcher and the output signals from the RF analog to baseband digital converter to send the M number of the signals among the output signals from the RF analog to baseband digital converter using the information on the intensity of the signal; fingers for receiving the M number of signals from the signal controller to estimate a common time delay information in the received M number of signals and for estimating original signals received per the plurality of antennas using the estimated time delay information and a time division method; and a combiner for receiving the estimated original signals from the fingers and for combining the original signals, to thus estimate original signals received by the plurality of antennas.

According to one aspect of the present invention, a method of estimating signals of a finger comprises a first step of combining signals, received by a plurality of antennas and having the almost same time delays, with an adequate delay to produce multiplexed signals; a second step of estimating a common time delay information on the multiplexed signals; a third step of de-spreading the multiplexed signals using the estimated time delay information to produce de-spread signals; a fourth step of estimating channel information on the de-spread signals; and a fifth step of demodulating the de-spread signals on signals of each of the antennas basis using the estimated channel information to estimate signals received by the plurality of antennas.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF THE INVENTION

The present invention will be described in detail by way of a preferred embodiment with reference to accompanying drawings.

Figure 1:
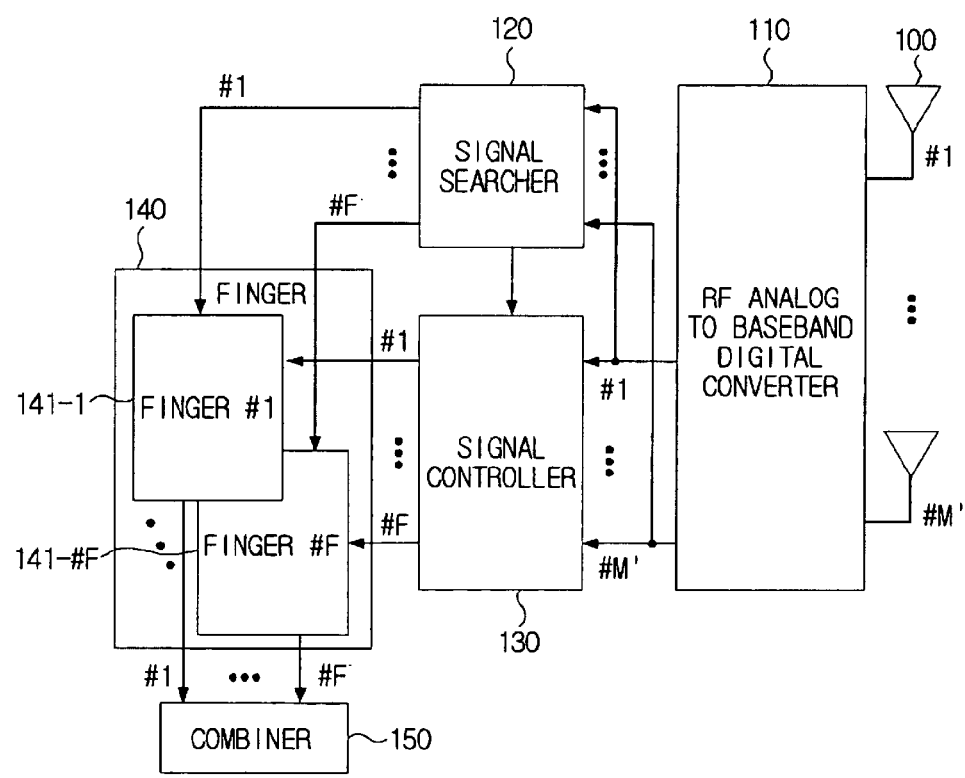
FIG. 1 shows a construction of a conventional RAKE receiver.
Figure 2:
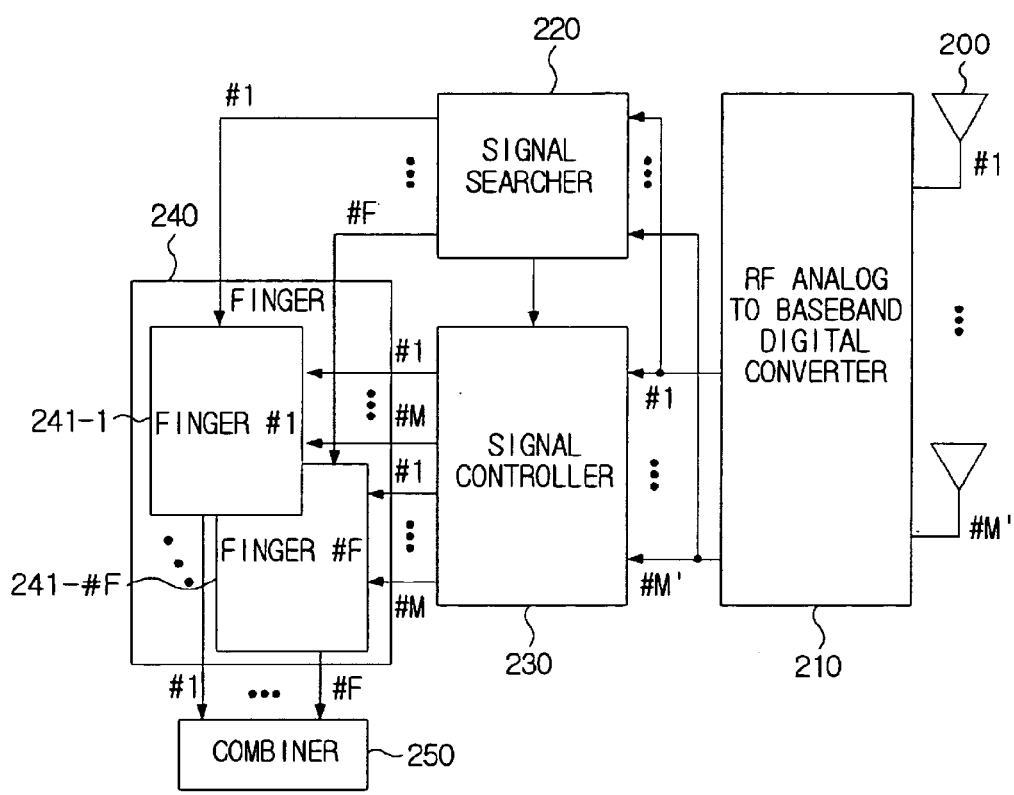
FIG. 2 is an overall structure of a RAKE receiver according to one embodiment of the present invention.

FIG. 2 is an overall structure of a RAKE receiver according to one embodiment of the present invention. It should be noted that the present invention employs a principle that the time delays of signals received via a plurality of antennas are the same if the distance between the antennas is not greater, compared to the wavelength of carrier waves, because the bandwidths of the signals received by the antennas are much smaller than the carrier wave.

The RAKE receiver according to the present invention includes a RF analog to baseband digital converter 210 for converting RF analog signals received by the M'-number of antennas 200 into baseband digital signals, a signal searcher 220 for generating information on the intensity of the signals received from the RF analog to baseband digital converter 210, a signal controller 230 for sending M number of the signals from the RF analog to baseband digital converter 210 to every one of fingers 240, according to the information from the signal searcher 220, fingers 240 for estimating original signals received by the plurality of antennas using the signals from the signal controller 230 and the signal searcher 220, and a combiner 250 for combining the original signals estimated at respective fingers to estimate original signals from the plurality of antennas.

The operation of the RAKE receiver having this structure will now be explained in detail. First, the RF analog signals received by the M' number of antennas 200 are converted into baseband digital signals at the RF analog to baseband digital converter 210. The converted signals are then inputted to the signal searcher 220 and the signal controller 230. The signal searcher 220 searches the intensity of the received signals and then informs the result to the signal controller 230 and fingers 240, respectively. Meanwhile, the signal controller 230 sends every M ($\leq$M') number of the signals received from the RF analog baseband digital converter 210 to every one of the fingers 240, according to information from the signal searcher 220. The fingers 240 estimate an original signal each of the M number of the signals received via individual paths and then forward the results to the combiner 250. The combiner 250 combines the original signals estimated at respective fingers 240 to estimate original signals received by the plurality of antennas 200. Also, the fingers 240 may send respective original signals for the M number of the estimated signals to the combiner after combining them.

Figure 3:
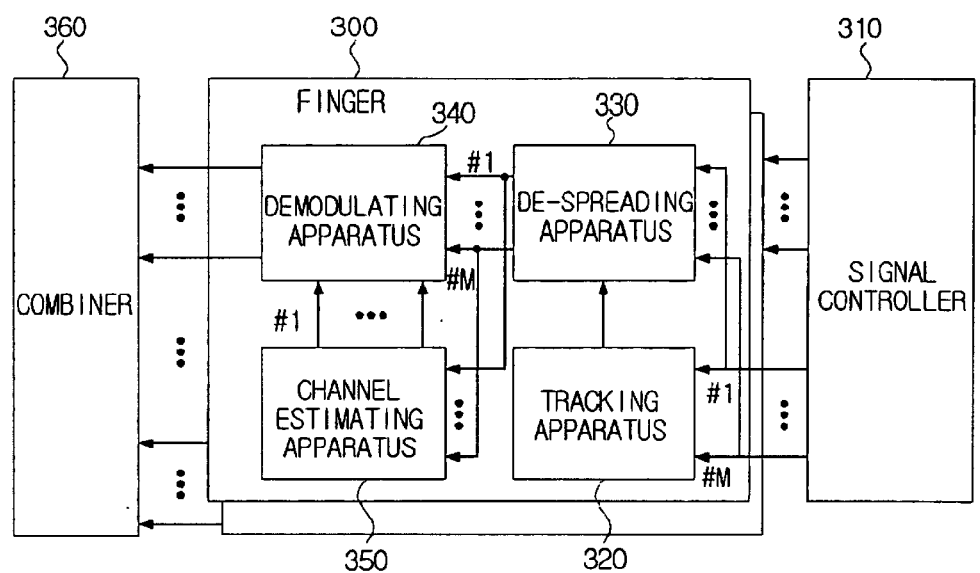
FIG. 3 is an overall structure using time division method according to one embodiment of the present invention.

Referring now to FIG. 3, there is shown an overall structure of a finger 300 in the RAKE receiver using time division method according to the present invention. The finger includes a tracking apparatus for detecting time delay of the signals transmitted from the signal controller 310, a de-spreading apparatus 330 for reverting the spread signals into before-spreading signals using the detected time delay, a demodulating apparatus 340 for demodulating the transmitted signals using the de-spread signals from the de-spreading apparatus 330 and channel estimates from a channel estimating apparatus 350, and a channel estimating apparatus 350 for estimating the states of the channels in the demodulating apparatus 340 to which the signals are inputted and then informs the results to the receiver. At this time, if the demodulating apparatus 340 does not need information on its channels and the state of the channels presently used are monitored outside the finger 300, the finger 300 may not include the channel estimating apparatus 350.

The operation of the finger 300 having this structure will now be explained in detail. The tracking apparatus 320 receives the signals having almost the same time delays received by the plurality of antennas through the signal controller 310 within the RAKE receiver. The received signals are processed through three steps. First, the tracking apparatus 320 detects any of the received signals having the time delay falling under a predetermined range error and then sending it to the de-spreading apparatus 330. Then, the de-spreading apparatus 330 uses the received information on the time delay to revert the spread signals into before-spreading signals. Here, if the de-spreading apparatus 330 does not know a spreading factor of the spread signal, it de-spreads the spread signal using a minimum spreading factor and then sends the de-spreaded signal to the demodulating apparatus 340. (After a spreading factor is obtained, the de-spread signals by the minimum spreading factor are then combined by the amount corresponding to the spreading factor, thus completing a de-spreading procedure.) Finally, the demodulating apparatus 340 detects the signals and then sends the detected signal to the combiner 360.

Figure 4:
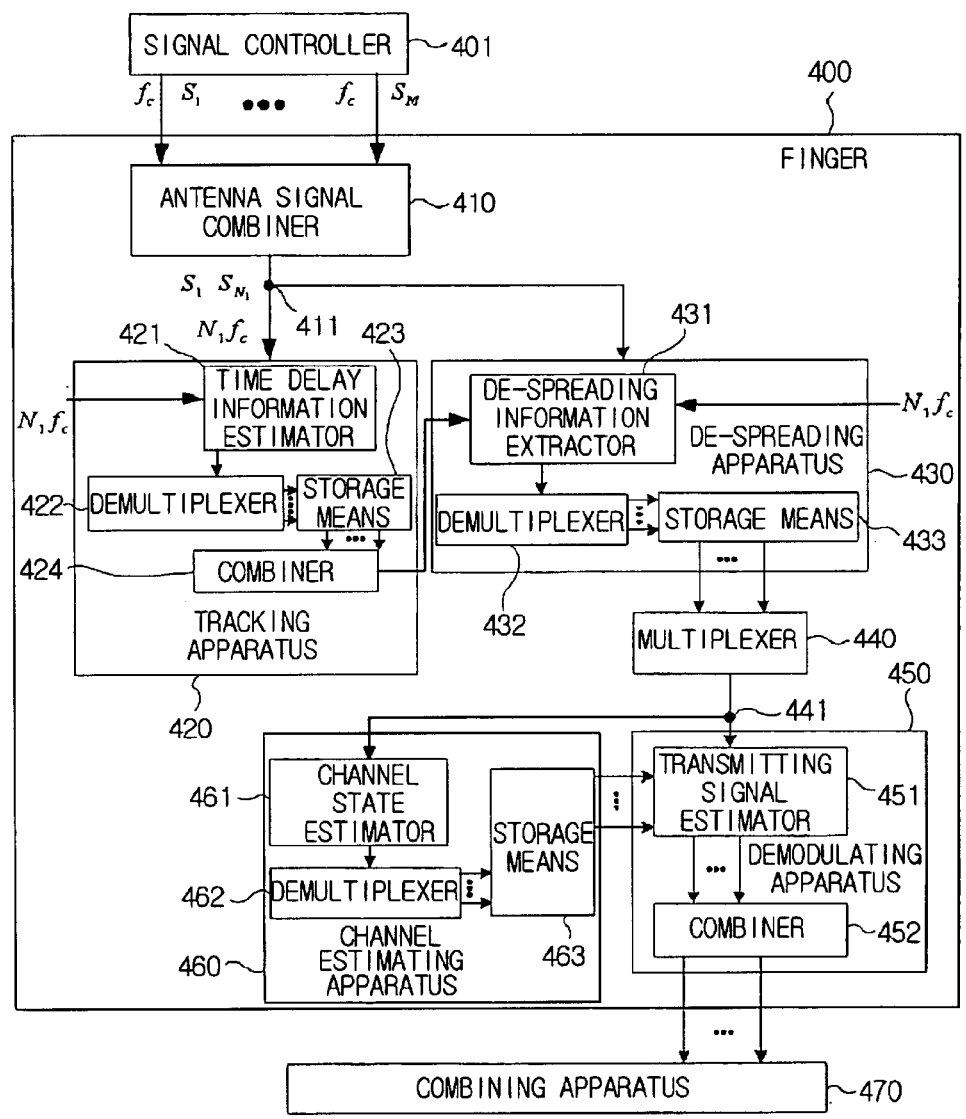
FIG. 4 is a detailed construction of a finger using time division method according to one embodiment of the present invention.

Referring to FIG. 4, there is shown a detailed construction of a finger 400 using a time division method according to one embodiment of the present invention. The structure of respective constituent elements constituting the finger 400 and their operation will be explained in detail.

The finger 400 includes a tracking apparatus 420 consisting of a time delay information estimator 421, a demultiplexer 422, a storage means 423 and a combiner 424; a de-spreading apparatus 430 consisted of a de-spreading information extractor 431, a demultiplexer 432 and a storage means 433; a channel estimating apparatus 460 consisted of a channel state estimator 461, a demultiplexer 462 and a storage means 463; a demodulating apparatus 450 consisting of a transmitting signal estimator 451 and a combiner 452; and a combining apparatus 470. The finger 400 further includes an antenna signal combiner 410 for combining received signals with an adequate delay and a multiplexer 440 for extending the distance between the received signals.

The operation of the finger 400 having this structure will be now explained. First, selected $N_1$ ($\leq$M) signals $S_1, \ldots S_{N1}$ among the signals from the signal controller 401 are inputted to the antenna signal combiner 410 within the finger 400. Then, the antenna signal combiner 410 adequately delays and combines the received $N_1$ number of signals so that a single apparatus can easily process a plurality of signals received from various antennas.

At this time, if the sampling rate of the signals received by the respective antennas is $f_c=1/T_c$, a combining method is employed by which an $N_1$ number of antennas are selected according to a pre-determined basis, signals received by a k-th (k=1 $\ldots$ $N_1$) antenna are combined with a (k−1) $T_c/N_1$ delay and the signals having the sampling rate of $f_c=N_1/T_c$ are produced.

The multiplexed signal 411 generated by these procedures is inputted to the tracking apparatus 420 for detecting time delays of the signals received by the plurality antennas. The inputted multiplexed signals 411 are then inputted to the time delay information estimator 421 in the tracking apparatus 420. At this time, in order to process the $N_1$ number of multiplexed signals, a time division method is employed, by which a time period of $T_c$ (=1/$f_c$) is processed by dividing it into the $N_1$ number of periods. Thus, a single signal can be processed every single period. The processed signals are inputted to the demultiplexer 422 for demultiplexing, which are then transmitted to the storage means 423 consisted of N1 storages. The signal processing procedure from the time delay information estimator 421 to the storage means 423 is repeated during a predetermined time or by a predetermined number of times. As a result, the signals are selectively combined at the combiner 424, thus producing time delay information on the $N_1$ number of multiplexed signals.

The estimated time delay information from the tracking apparatus 420 and the $N_1$ number of the multiplexed signals from the antenna signal combiner 410 are inputted to the de-spreading apparatus 430. A single de-spreading apparatus 430 processes the inputted $N_1$ number of the multiplexed signals and the estimated time delay information using a time division method. Thus, the signals inputted to the de-spreading apparatus 430 are processed one by one during every single period. The processed signals are then inputted to the demultiplexer 432 for demultiplexing. Thereafter, the demultiplexed signals are inputted to the storage means 433. At this time, the inputted signals are differently stored into the $N_1$ number of the storage means. The signal processing procedure from the dispreading information extractor 431 to the storage means 433 is repeated during a predetermined time or by a predetermined number of times, as in the process by the tracking apparatus 420, so that the inputted signals can be de-spread. The output signals of the de-spreading signal, that is, from the dispreading apparatus 430 in which the $N_1$ number of signals are bundled by $T_c/N_1$ distance, are produced a symbol period or every symbol period depending on a minimum spreading factor. The produced signals are then inputted to the demodulating apparatus 450 and the channel estimating apparatus 460, respectively.

On the other hand, before the output signals from the dispreading apparatus 430 are inputted to the demodulating apparatus 450 and the channel estimating apparatus 460, the multiplexer 440 can extend the distance between the $N_1$ number of the signals being the output signals of the dispreading apparatus 430 so that the demodulating apparatus 450 and the channel estimating apparatus 460 can be smoothly operated. The de-spread signals 441 transformed through these procedures are then inputted to the channel estimating apparatus 460 and the demodulating apparatus 450, respectively, thus smoothly operating the channel estimating apparatus 460 and the demodulating apparatus 450.

The de-spread signals or the transformed de-spread signals 441 are then inputted to the channel state estimator 461 in the channel estimating apparatus 460. The channel state estimator 461 processes respective signals by dividing the time period of $T_c$ into the $N_1$ number of periods Thus, a single signal every respective period can be processed, that is, channels of respective signals can be estimated. The channel information on the respective estimated signals are inputted to the demultiplexer 462 and the demultiplexed information are then stored at the storage means 463. Thus, channels of the signals received by the respective antennas can be estimated.

Meanwhile, the output signal or the transformed dispreading signals 441 of the de-spread apparatus 430 and the estimated channel information from the channel estimating apparatus 460 are inputted to the transmitting signal estimator 451 in the demodulating apparatus 450. The transmitting signal estimator 451 performs a demodulating process on a signal basis of respective antennas by dividing the time period of $T_c$ into the $N_1$ number of periods, thus estimating original signals of the respective signals per antenna.

In case that a non-coherent demodulating apparatus is employed, the demodulating apparatus divides the time period of $T_c$ being a given time period into the $N_1$ number of periods without any output signal from the channel estimating apparatus and the transmitting signal estimator performs a non-coherent demodulating process on a signal basis of respective antennas.

Each of the original signals estimated at the transmitting signal estimator 451 is inputted to the combiner 452. The combiner 452 selectively combines each of the inputted original signals to estimate the original signals received by the plurality of antennas. The output signals of the demodulating apparatus 450, being the estimated original signals, are inputted to the combining apparatus 470 so that they can be combined by a predetermined method, or are separately inputted to the combining apparatus 470 so that they can be combined by a predetermined method along with the outputs from different fingers.

The present invention has been described with reference to a particular embodiment in connection with a particular application. Those having ordinary skill in the art and access to the teachings of the present invention will recognize additional modifications and applications within the scope thereof.

It is therefore intended by the appended claims to cover any and all such applications, modifications, and embodiments within the scope of the present invention.

As mentioned above, the present invention can implement a high-performance finger capable of combining a log of signals, in which a single finger can effectively process signals having the same time delays and received by a plurality of antennas using a time division method. Also, the present invention has an effect that it can implement a finger of a simplified structure and a RAKE receiver having the same since it includes a single apparatus for batch-processing a common calculation within the finger and a plurality of apparatuses for performing separate calculations.

What is claimed is:

1. A finger comprising:

an antenna signal combiner for combining signals received by a plurality of antennas and having the same time delays with an adequate delay to produce multiplexed signals;

a tracking apparatus for receiving said multiplexed signals to estimate time delay information on said multiplexed signals;

a de-spreading apparatus for de-spreading said multiplexed signals with said estimated time delay information, each of which are received from said antenna signal combiner and said tracking apparatus, respectively;

a channel estimating apparatus for estimating channel information of said de-spread signals received from said de-spreading apparatus; and a demodulating apparatus of demodulating said de-spread signals received from said de-spreading apparatus, to estimate original signals received by said plurality of antennas, wherein said channel estimating apparatus includes a channel state estimator for receiving said multiplexed signals from said multiplexer to estimate channel information on the signals per the plurality of the antennas using a time division method, a demultiplexer for demultiplexing the output signals from said channel state estimator and a plurality of storage means for storing said demultiplexed signals from said demultiplexer, so that channel information on each of said antennas basis is estimated.

2. The finger according to claim 1, further including a multiplexer for receiving said de-spread signals from said de-spreading apparatus, extending the distance between signals of said de-spread signals to produce transformed de-spread signals and transmitting said transformed de-spread signals to said demodulating apparatus.

3. The finger according to claim 1, wherein said tracking apparatus includes a time delay information estimator for estimating each of time delay information on said multiplexed signals received from said antenna signal combiner using a time division method, a demultiplexer for demultiplexing said time delay information, a plurality of storage means for storing each of said demultiplexed signals and a combiner for adequately selecting or combining the result in which the procedure from said demultiplexer to said storage means is repeated during a predetermined time or by a predetermined number of times to estimate time delay information on said demultiplexed signals.

4. The finger according to claim 1, wherein said de-spreading apparatus includes a de-spread information extractor for receiving the estimated time delay information from said tracking apparatus and said multiplexed signals from said antenna signal combiner to de-spread each of the signals using a time division method, a demultiplexer for demultiplexing said de-spread signals and a plurality of storage means for storing each of said de-spread signals, wherein the procedure from said de-spread information extractor to said storage means is repeated during a predetermined time or by a predetermined number of times to de-spread said multiplexed signals.

5. The finger according to claim 1, wherein said demodulating apparatus includes a transmitting signal estimator for performing a demodulating process of each of the signals per the plurality of antennas of said multiplexed signals received from said multiplexer, using the time division method, and a combiner for adequately selecting and combining the output signals from said transmitting signal estimator to estimate original signals received by the plurality of antennas.

6. The finger according to claim 1, wherein said demodulating apparatus demodulates only said de-spread signals from said de-spread apparatus to estimate original signals received by said plurality of antennas.

7. A RAKE receiver comprising:
a RF analog to baseband digital converter for converting RF analog signals received by a plurality of antennas having the same time delays into baseband digital signals;
a signal searcher for receiving the output signals from said RF analog to baseband digital converter to generate information on the intensity of the baseband digital signals;
a signal controller for receiving information on the intensity of the signals for said signal searcher and the output signals from said RF analog to baseband digital converter to send the M number of the signals among the output signals from said RF analog to baseband digital converter using the information on the intensity of said signal;
fingers for receiving the M number of signals from said signal controller to estimate a common time delay information in the received M number of signals and for estimating original signals received per the plurality of antennas using said estimated time delay information and a time division method; and
a combiner for receiving said estimated original signals from said fingers and for combining said original signals, to thus estimate original signals received by the plurality of antennas,
wherein said finger includes:
an antenna signal combiner for combining signals received by a plurality of antennas and having the almost same time delays with an adequate delay to produce multiplexed signals;
a tracking apparatus for receiving said multiplexed signals to estimate time delay information on said multiplexed signals;
a de-spreading apparatus for de-spreading said multiplexed signals with said estimated time delay information, each of which are received from said antenna signal combiner and said tracking apparatus, respectively;
a channel estimating apparatus for estimating channel information of said de-spread signals received from said de-spreading apparatus; and
a demodulating apparatus of demodulating said de-spread signals received from said de-spreading apparatus, to estimate original signals received by said plurality of antennas.
wherein said channel estimating apparatus includes a channel state estimator for receiving said multiplexed signals from said multiplexer to estimate channel information on the signals per the plurality of the antennas using a time division method, a demultiplexer for demultiplexing the output signals from said channel state estimator and a plurality of storage means for storing said demultiplexed signals from said demultiplexer, so that channel information on each of said antennas basis is estimated.

8. The RAKE receiver according to claim 7, further including a multiplexer for receiving said de-spread signals from said de-spreading apparatus, extending the distance between signals of said de-spread signals to produce transformed de-spread signals and transmitting said transformed de-spread signals to said demodulating apparatus.

9. The RAKE receiver according to claim 7, wherein said tracking apparatus includes a time delay information estimator for estimating each of time delay information on said multiplexed signals received from said antenna signal combiner using a time division method, a demultiplexer for demultiplexing said time delay information, a plurality of storage means for storing each of said demultiplexed signals and a combiner for adequately selecting or combining the result in which the procedure from said demultiplexer to said storage means is repeated during a predetermined time or by a predetermined number of times to estimate time delay information on said demultiplexed signals.

10. The RAKE receiver according to claim 7, wherein said de-spreading apparatus includes a de-spread information extractor for receiving the estimated time delay information from said tracking apparatus and said multiplexed signals from said antenna signal combiner to de-spread each of the signals using a time division method, a demultiplexer for demultiplexing said de-spread signals and a plurality of storage means for storing each of said de-spread signals, wherein the procedure from said de-spread information extractor to said storage means is repeated during a predetermined time or by a predetermined number of times to de-spread said multiplexed signals.

11. The RAKE receiver according to claim 7, wherein said demodulating apparatus includes a transmitting signal estimator for performing a demodulating process of each of the signals per the plurality of antennas for said multiplexed signals received from said multiplexer, using the time division method, and a combiner for adequately selecting and combining the output signals from said transmitting signal estimator to estimate original signals received by the plurality of antennas.

12. The RAKE receiver according to claim 7, wherein said demodulating apparatus demodulates only said de-spread signals from said de-spread apparatus to estimate original signals received by said plurality of antennas.

13. A method of estimating signals of a finger, comprising:

a first step of combining signals received by a plurality of antenna and having the almost same time delays with an adequate delay to produce multiplexed signals;

a second step of estimating a common time delay information on said multiplexed signals;

a third step of de-spreading said multiplexed signals using said estimated time delay information to produce de-spread signals;

a fourth step of estimating channel information on said de-spread signals; and a fifth step of demodulating said de-spread signals on signals of each of the antennas basis using said estimated channel information to estimate signals received by said plurality of antennas, wherein said third step further includes:

a first sub-step of extending the distance between said de-spread signals to produce transformed de-spread signals; and a second sub-step of transmitting said transformed de-spread signals to said fourth step and said fifth step, respectively.

* * * * *